(12) United States Patent
Anderson (10) Patent No.: US 10,338,890 B1
(45) Date of Patent: Jul. 2, 2019

(54) RANDOM VALUES FROM DATA ERRORS

(71) Applicant: Seagate Technology LLC, Cupertino, CA (US)

(72) Inventor: William Erik Anderson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 691 days.

(21) Appl. No.: 14/591,765

(22) Filed: Jan. 7, 2015

(51) Int. Cl.
*G06F 7/58* (2006.01)
*G06F 17/18* (2006.01)

(52) U.S. Cl.
CPC .............. *G06F 7/582* (2013.01); *G06F 17/18* (2013.01); *G06F 2207/58* (2013.01)

(58) Field of Classification Search
None
See application file for complete search history.

(56) References Cited

U.S. PATENT DOCUMENTS

| | | | |
|---|---|---|---|
| 4,571,546 A | 2/1986 | Wilkinson | |
| 5,200,962 A | 4/1993 | Kao | |
| 5,282,211 A | 1/1994 | Manlick et al. | |
| 5,732,138 A | 3/1998 | Noll et al. | |
| 6,557,136 B1 | 4/2003 | Friedmann | |
| 6,931,425 B2 | 8/2005 | Xie et al. | |
| 6,944,206 B1 | 9/2005 | Dent | |
| 7,561,358 B2 | 7/2009 | Wang | |
| 7,587,047 B2 | 9/2009 | Crandall et al. | |
| 7,650,507 B2 | 1/2010 | Crandall et al. | |
| 8,015,224 B1 | 9/2011 | Chaichanavong et al. | |
| 8,130,955 B2 | 3/2012 | Trichina et al. | |
| 8,412,758 B2 | 4/2013 | Numminen | |
| 8,566,377 B2 | 10/2013 | Harris et al. | |
| 8,583,711 B2 | 11/2013 | Hars | |
| 8,635,260 B2 | 1/2014 | Hars | |
| 8,650,234 B2 | 2/2014 | Cho et al. | |
| 8,856,199 B2 | 10/2014 | Tanamoto et al. | |
| 2003/0012372 A1 | 1/2003 | Cheng | |
| 2004/0107398 A1 | 6/2004 | Johnson | |
| 2004/0131120 A1 | 7/2004 | Kim et al. | |
| 2004/0133836 A1 | 7/2004 | Williams | |
| 2004/0196974 A1 | 10/2004 | Shim | |
| 2004/0248549 A1 | 12/2004 | Drews | |
| 2005/0102598 A1 | 5/2005 | Shokrollahi | |
| 2010/0030958 A1* | 2/2010 | Guyot | G06F 7/58 711/112 |
| 2010/0195829 A1 | 8/2010 | Blom et al. | |

(Continued)

OTHER PUBLICATIONS

Anderson, Random Values From Error Correcting Codes, U.S. Appl. No. 14/547,358, filed Nov. 19, 2014, 17 Pages.

(Continued)

*Primary Examiner* — David H Malzahn
(74) *Attorney, Agent, or Firm* — Cesari & Reed, LLP; Kirk A. Cesari (57) ABSTRACT

Systems and methods for calculating random values based on data errors are presented. A message collection circuit may collect sets of data having data errors and store them to a memory. The stored sets of data may then be processed to produce a random value based on errors in the sets of data. The random value(s) may be provided to random number generator(s), encryption circuit(s), or other circuit(s).

20 Claims, 5 Drawing Sheets

(56) References Cited

U.S. PATENT DOCUMENTS

| | | | |
|---|---|---|---|
| 2010/0250638 A1* | 9/2010 | Asami | H03H 17/0294 |
| | | | 708/304 |
| 2011/0022648 A1* | 1/2011 | Harris | G06F 7/588 |
| | | | 708/254 |
| 2012/0297271 A1 | 11/2012 | Sommer | |
| 2013/0090903 A1 | 4/2013 | Dayka et al. | |
| 2014/0169092 A1 | 6/2014 | Miyamoto | |
| 2015/0193204 A1* | 7/2015 | Lin | G06F 7/588 |
| | | | 708/250 |
| 2016/0087654 A1 | 3/2016 | Anderson | |

OTHER PUBLICATIONS

Anderson, Random Values From Data Errors, U.S. Appl. No. 14/571,279, filed Nov. 19, 2014, 28 Pages.

Anderson, Random Values From Data Errors, U.S. Appl. No. 14/571,279, filed Dec. 15, 2014, 29 Pages.

\* cited by examiner

RANDOM VALUES FROM DATA ERRORS

SUMMARY

In some embodiments, an apparatus can include an extractor circuit configured to collect data messages having an error, calculate a random value based on the data messages, and provide the random value to a random number generator.

In some embodiments, a system can include a circuit configured to extract erroneous messages from a data channel and calculate a random value based on the erroneous messages.

In some embodiments, a method can include collecting data messages, calculating a random value based on the data messages, and providing the random value to a random number generator.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented in firmware, or as one or more software programs running on a computer processor or controller. In accordance with some embodiments, the methods and functions described herein may be implemented as one or more software programs running on a computing device, such as a personal computer that is using a disc drive. Dedicated hardware implementations including, but not limited to, application specific integrated circuits, and other hardware devices can likewise be constructed to implement the methods and functions described herein. Further, the methods described herein may be implemented as a computer readable storage medium or device including instructions that when executed cause a processor to perform the methods.

Examples are provided herein illustrating a system of generating random values based on random errors. The random values may be used as a random value by random number generators, encryption circuits, or other circuits.

Random values may be used for data encryption, which may include the transformation of an input data sequence (e.g. plaintext) to an encrypted output data sequence (e.g. cipher text) using a selected encryption method (e.g. a cipher). Encryption circuits can include ciphers and can use one or more pieces of auxiliary data (e.g. encryption keys) to encrypt the plaintext by various encryption methods. The security of an encryption method can depend on the amount of entropy in the encryption keys; thus, the more entropy an encryption key has, the more secure the encryption method will be.

To help generate strong encryption keys, random number generators can be used. A random number generator can generate pseudorandom numbers based on a random value received from a source of randomness. The strength of the pseudorandom numbers is dependent on the strength of the random value; thus, the more entropy the random value has the higher quality of randomness the random number generator can generate.

Examples are provided herein of random value generator circuits (which themselves could be random number generators) that can generate random values (e.g. seeds) based on noise from electrical systems, where the noise can produce random errors in data. Noise in electrical systems can include distortion of signals or errors in data and may be caused by electromagnetic interference, radiation, or other environmental factors, as well as other factors. Noise may also be caused by errors due to the entropy (e.g. a measure of the randomness of errors in a transmitted signal or message) of a system. Entropy may be due to natural sources such as quantum mechanics (e.g. electric charges trapped in the oxide of the channel silicon), oxide thickness, Johnson-Nyquist noise (i.e. thermal noise), or other natural sources, and may be difficult to predict or replicate. Other sources of entropy can include system temperature variations (e.g. temperature swings due to writing data, the ability of the system to dissipate heat to its surrounding environment, etc.), noise due to reading from or writing to a storage device (e.g. writing a data cell and corrupting a neighboring cell(s)), or other sources.

Randomness can cause errors by changing the value of a signal in unpredictable ways. In digital systems, logic high values (1s) can be represented by a signal voltage at or above a first threshold, and logic low values (e.g. 0s) can be represented by a signal voltage at or below a second threshold. For example, in some five volt transistor-transistor logic (TTL) systems, a logic low may be determined from a voltage at or below 0.8 volts, and a logic high may be determined from a voltage between 2.2 volts and 5 volts. A random error may change the voltage of the signal. When the signal errors do not change the logic value of the data, they may go unnoticed or may be ignored. In some cases, voltage changes due to random errors may be large enough to change the logic state of the data (e.g. high to low or vice versa), or from a valid logic state to an undetermined state. For example, noise can change a voltage from 0.6 volts (logic low) to 1.7 volts (undetermined). When a signal voltage is in an undetermined range, the data may be unreliable.

Some data storage devices, such as solid state data storage devices, may have a limited number of physical sources from which to derive entropy. One of those sources may be a data channel. As data is transmitted or received by a data channel, such as by reading or writing to a data storage medium (e.g. flash memory or disc memory) or other transmitting or receiving of data, data errors may occur, which may have random error rates conducive to generating strong encryption keys for data security. As described herein, examples are provided that can generate a random value based on errors in a data channel.

Figure 1:
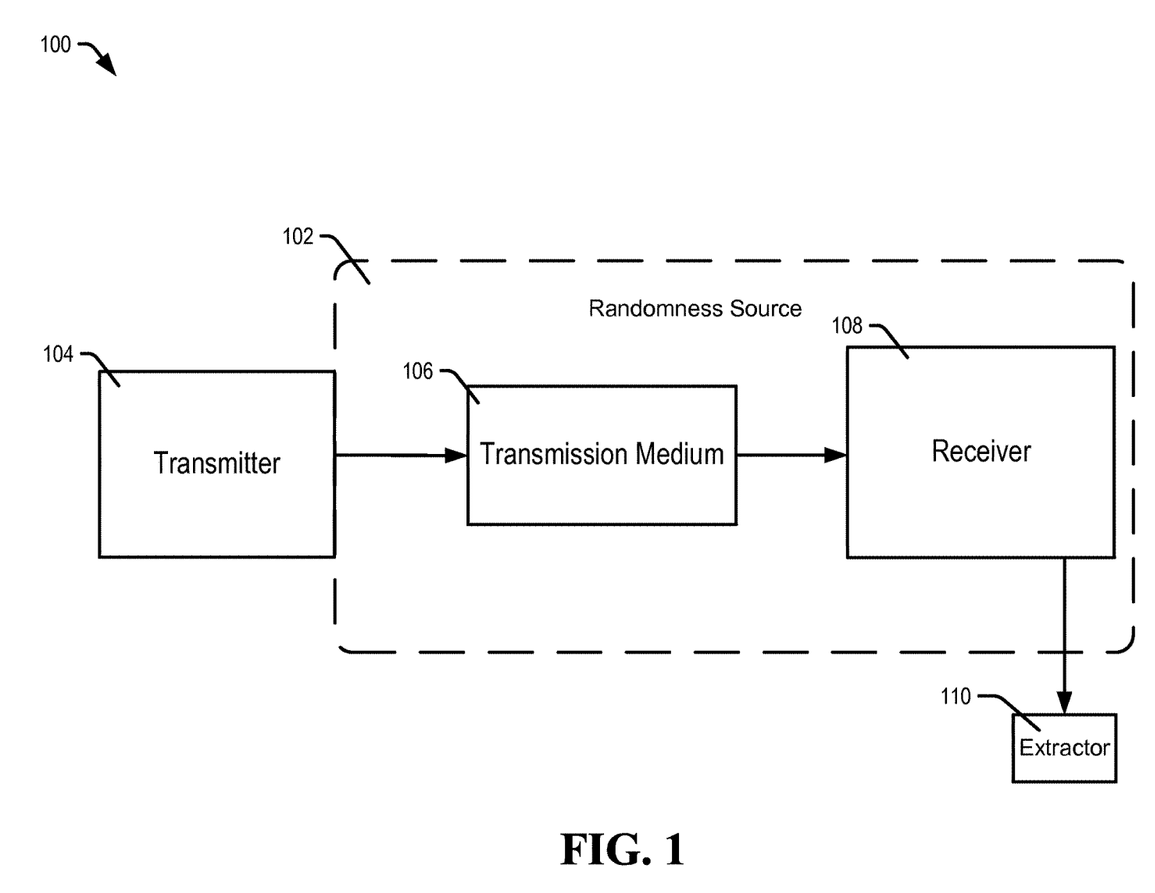
FIG. 1 is a diagram of a system configured to determine random values from data errors, in accordance with certain embodiments of the present disclosure.

Referring to FIG. 1, a system configured to calculate random values from data errors is shown and generally designated 100. System 100 can include a randomness source 102, which may include a transmission medium 106, and receiver 108. The randomness source 102 may be coupled to a transmitter 104 and extractor 110.

In some embodiments, the transmitter 104 may be an antenna, transducer, transceiver, sensor, laser, or other device capable of transmitting data to the receiver 108 via the transmission medium 106. The transmission medium 106 may be a data storage medium, liquid medium, wireless medium, other medium, or any combination thereof. The receiver circuit 108 may be an antenna, transceiver, transducer, sensor, detector, or other device capable of receiving data from the transmission medium 106. In some embodiments, the randomness source 102 may be a data channel. The extractor circuit 110 may be an application specific integrated circuit (ASIC), field programmable gate array (FPGA), or other circuit. In some cases, the extractor circuit 110 may be a processor executing instructions stored in a memory, executable software, and so forth.

During operation, the transmitter 104 may transmit a signal to the receiver 108 via the transmission medium 106. Noise in the randomness source 102 can cause random errors in the signal. For example, electrical storms can add random noise to amplitude modulated (AM) and frequency modulated (FM) radio signals, solar flares can interfere with satellite communications, and quantum effects can cause random errors to occur to data stored to a memory. Noise can also occur in computer chips due to overheating or other factors. Data errors may cause changes to data already stored to a memory. In some examples, data errors corresponding to the data stored in a memory may be included in the randomness source 102.

The extractor circuit 110 can extract random errors from the signal received by the receiver 108 by sampling the signal to collect the random errors. The extractor circuit 110 may process the random errors to generate a random value. The random value may be provided to random number generator(s), encryption key generator(s), or other circuit(s).

Figure 2:
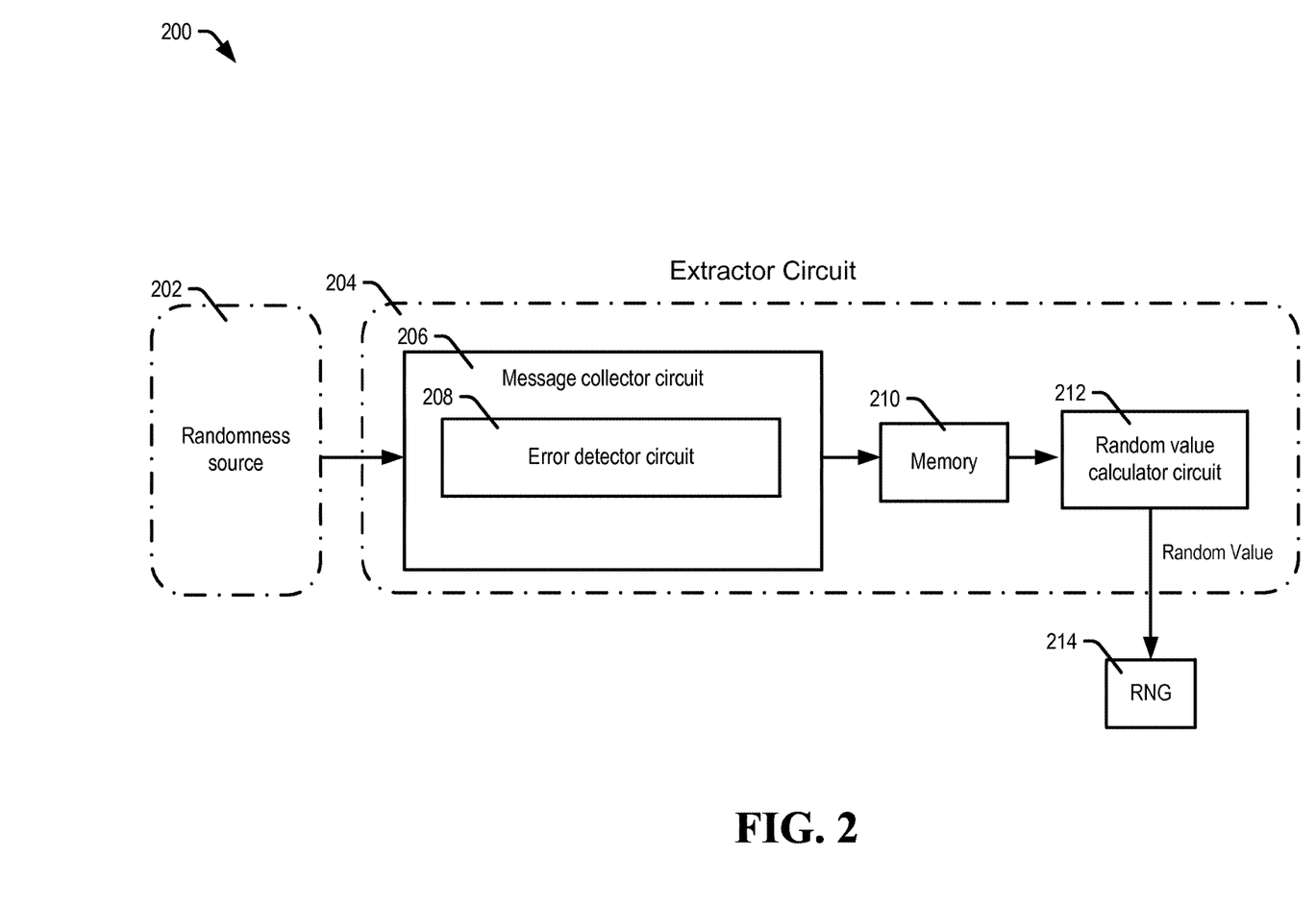
FIG. 2 is a diagram of a system configured to determine random values from data errors, in accordance with certain embodiments of the present disclosure.

Referring to FIG. 2, a system configured to determine random values from data errors is shown and generally designated 200. System 200 is an example of system 100 according to certain embodiments. System 200 can have a randomness source 202, which may be the randomness source 102, coupled to an extractor circuit 204. The extractor circuit 204, which may be the extractor circuit 110, can be coupled to a random number generator (RNG) 214. In some embodiments, the extractor circuit 204 may be coupled to encryption circuits, or other circuits.

The randomness source 202 may be any source that causes noise or error in a signal. For example, a transmitter, transmission medium, or receiver may be a randomness source, separately, together, or in any combination.

The extractor circuit 204 can include a message collector circuit 206 coupled to a memory 210, and a random value calculator circuit 212. The message collector circuit can include an error detector circuit 208.

The message collector circuit 206 may be an ASIC, FPGA, system on chip (SOC), integrated with the random value calculator circuit 212, or other circuit. In some cases, the message collector circuit 206 may be a processor executing instructions stored in a memory, executable software, and so forth. The random value calculator circuit 212 may be an ASIC, FPGA, SOC, integrated with the message collector circuit 206, or other circuit. In some cases, the random value calculator circuit 212 may be a processor executing instructions stored in a memory, executable software, and so forth. The memory 210 may be may be non-volatile solid state memory such as flash memory, spin-torque transfer random access memory (STRAM), resistive random access memory (RRAM), ferromagnetic random access memory (FRAM), and so forth. In some cases, the memory 210 may be a first in first out (FIFO) circuit, shift register, or other device.

Two examples of operation of the extractor circuit 204 are given below. The first example includes certain embodiments in which the operation of the extractor circuit 204 collects a number of random errors from the randomness source 202, where the randomness distribution (i.e. distribution of the random errors) of the randomness source 202 may not be known. The second example includes certain embodiments in which the operation of the extractor circuit 204 calculates random values based on random errors where the randomness distribution of the randomness source 202 is that of a binary symmetric channel (see FIG. 3 and related description).

Referring to the first example, the message collector circuit 206 can collect a number "N" of messages from the randomness source 202. The messages can be a string of bits, such as four bits, eight bits, 256 bits, etc., and may or may not contain data errors. The number N may be an integer determined based on the minimum desired amount of randomness ($E_{min}$), and the length of the messages. In some cases, N may be changed on the fly or determined during product manufacturing or design. See the second example for an example of how N is determined to achieve a minimum amount of randomness when the randomness source is a binary symmetric channel. Further, the messages may be selectively collected, such as by periodic sampling, aperiodic sampling, or based on a trigger (e.g. detection of an error). Thus, in some embodiments, not all messages need be collected, as it is not required that the collected messages be successive messages as received by a receiver or data channel.

The collected messages may be stored in a memory, which may be the memory 210 or another memory, where, after the N messages have been collected, the messages may be provided to the error detector circuit 208. In some cases, the messages may be provided to the error detector circuit 208 as they are collected, while in other examples, the message collector circuit 206 may store one or more messages in a queue until sufficient resources are available for further processing.

The error detector circuit 208 can analyze the collected messages to determine which, if any, of the collected messages have errors by comparing the messages to their corresponding error correction codes, or by other methods. Selected erroneous messages (i.e. messages having at least one data error or some other error threshold) may be stored to the memory 210. The memory 210 can be configured to store a plurality of the erroneous messages. For example, the memory 210 can be configured to store N erroneous messages, although in some examples, the memory 210 may store more or less than N erroneous messages.

The random value calculator circuit 212 can receive the erroneous messages from the memory 210 and form a random value based on the erroneous messages. For example, the random value calculator circuit 212 can be a hardware circuit configured to concatenate five eight-bit erroneous messages to form a random value forty bits long. The random value may then be provided to the RNG 214. In some embodiments, the random value calculator circuit 212 may calculate the random value by performing other operations on the erroneous messages. For example, the random value calculator circuit 212 may add, subtract, integrate, differentiate, multiply, exclusive or (XOR), or otherwise combine the erroneous messages to form the random value. In some cases, the random value calculator circuit 212 can generate the random value from some or all of the erroneous messages in the memory 210. Further, a random value may be combined with previously generated random values to generate a new random value.

Figure 3:
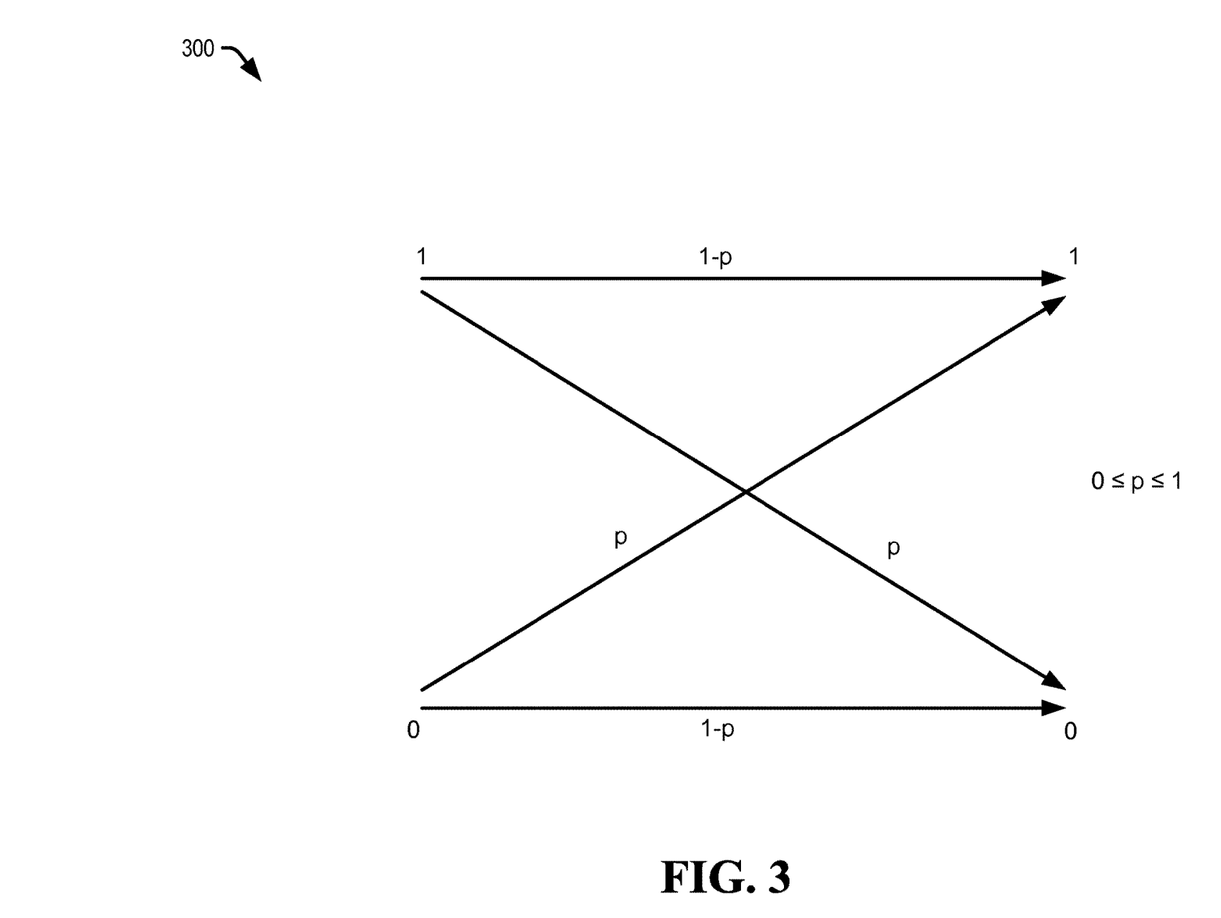
FIG. 3 is an illustrative embodiment of a binary symmetric channel distribution source, in accordance with certain embodiments of the present disclosure.

Referring to the second example, the extractor circuit 204 can be a source specific extractor optimized to operate with a binary symmetric channel randomness distribution source (see FIG. 3 and related description). Source specific extractors can be tailored to a source distribution by estimating (or empirically analyzing) the randomness distribution in a system and configuring the extractor accordingly. A source specific extractor corresponding to a binary symmetric channel randomness distribution may be an exclusive-or (XOR) extractor.

During operation, the message collector circuit 206 can collect N messages of length "M". The error detector circuit 208 can generate error vectors "R" for each of the collected messages (R can be the same length as M), including those messages having no errors. The error detector circuit 208 can determine the value of an error vector by comparing the collected message to the original message. For example, the error detector circuit 208 can perform an XOR operation ($\oplus$ denotes an XOR operation) on the received data and the corresponding sent data to generate an error vector. XOR operations can compare received data and corresponding sent data, and can output a '0' when corresponding bits of the received data and the corresponding sent data are the same (i.e. no errors), and a logic '1' when the corresponding bits are different (i.e. errors). For example, $00 \oplus 01 = 01$. When the error vector does not have any errors, R may be zero (i.e. 000 . . . ).

Each of the N messages and their corresponding R error vectors may be stored to the memory 210. The random value calculator circuit 212 can calculate the random value by XOR-ing the N messages and the corresponding R error vectors together. For example, the random value, E, may be calculated as $E = H_\infty(M_1 \oplus R_1) \oplus \ldots \oplus (M_N \oplus R_N)$, where $H_\infty$ is the message space. The resultant data string may be provided as a random value to the RNG 214, or may be further processed.

The message space, $H_\infty$, may include sources of random errors, such as memory (e.g. flash, disc, etc.), data channels, etc. For purposes of example two, it is assumed that the message space, $H_\infty$, has a binary symmetric channel data error distribution. $H_\infty$ may be considered when $E_{min}$ is determined.

The minimum amount of randomness, $E_{min}$, in a binary symmetric channel error distribution may be based on the length "M" of the messages, the number N of the message collected, and the probability "p" that an error will occur in a message. When the randomness source 202 has the distribution profile of a binary symmetric channel error distribution source, the relationship between $E_{min}$, p, M, and N can be expressed in the following equations:

$$E_{min} \leq H_\infty(\Sigma_{i=1,\ldots,n}(M_i \oplus R_i)) \leq m \quad (1)$$

Equation 1 can be rewritten as:

$$E_{min} \leq H_\infty(M_1 \oplus R_1) \oplus \ldots \oplus (M_N \oplus M_N) \leq M \quad (2)$$

$E_{min}$ can also be expressed as $$E_{min} = xM \quad (3)$$

where x is multiplication factor and $0 < x \leq 1$; therefore $$xM \leq H_\infty(\Sigma_{i=1,\ldots,n}(M_i \oplus R_i)) \leq M \quad (4)$$

The number of m-bit data messages necessary to achieve $E_{min}$ is:

$$1 - x = \log_2(1 + (1 - 2p)^N) \quad (5)$$

As an example, consider a system in which the message length M is four bits, the probability "p" that a bit has an error is $1e^{-5}$ (one in one hundred thousand bits may have an error), $E_{min}$ is 3.6 bits, and x is 0.9; $E_{min}$ is at its maximum when $x=1$. The number N of four bit data messages that can be collected to achieve $E_{min} = 3.6$ bits of randomness is:

$$0.9 = \log_2(1 + (1 - 2e^{-5})^N) => N = 131{,}710 \quad (6)$$

Therefore, an example extractor circuit 204 can collect and XOR 131,710 four bit data messages and error vector pairs together to achieve a minimum of 3.6 bits of randomness. In other words, the message collector circuit 206 can collect 526,840 bits (65,855 bytes) of message data.

In addition to the above examples, other embodiments of calculating random values from random errors are possible. In some examples, the extractor circuit 204 can include, or be coupled to one or more data converters, allowing the extractor circuit to calculate random values based on errors in analog signals.

Referring to FIG. 3, an illustrative embodiment of a binary symmetric channel distribution source is shown and generally designated 300. In binary symmetric channel distribution sources, the noise probability, p, that a logic low and logic high can randomly change under the same circumstances is equal (symmetric). The probability that a logic high will remain a logic high is the same as the probability that a logic low will remain a logic low, and is inversely proportional to the probability that the data will change value. For example, when the noise probability is 0.2, there is a 20 percent probability that the data will change value, and an 80 percent probability that the data will not change. In some cases, XOR extractors can extract data errors from binary symmetric channel distribution sources.

Figure 4:
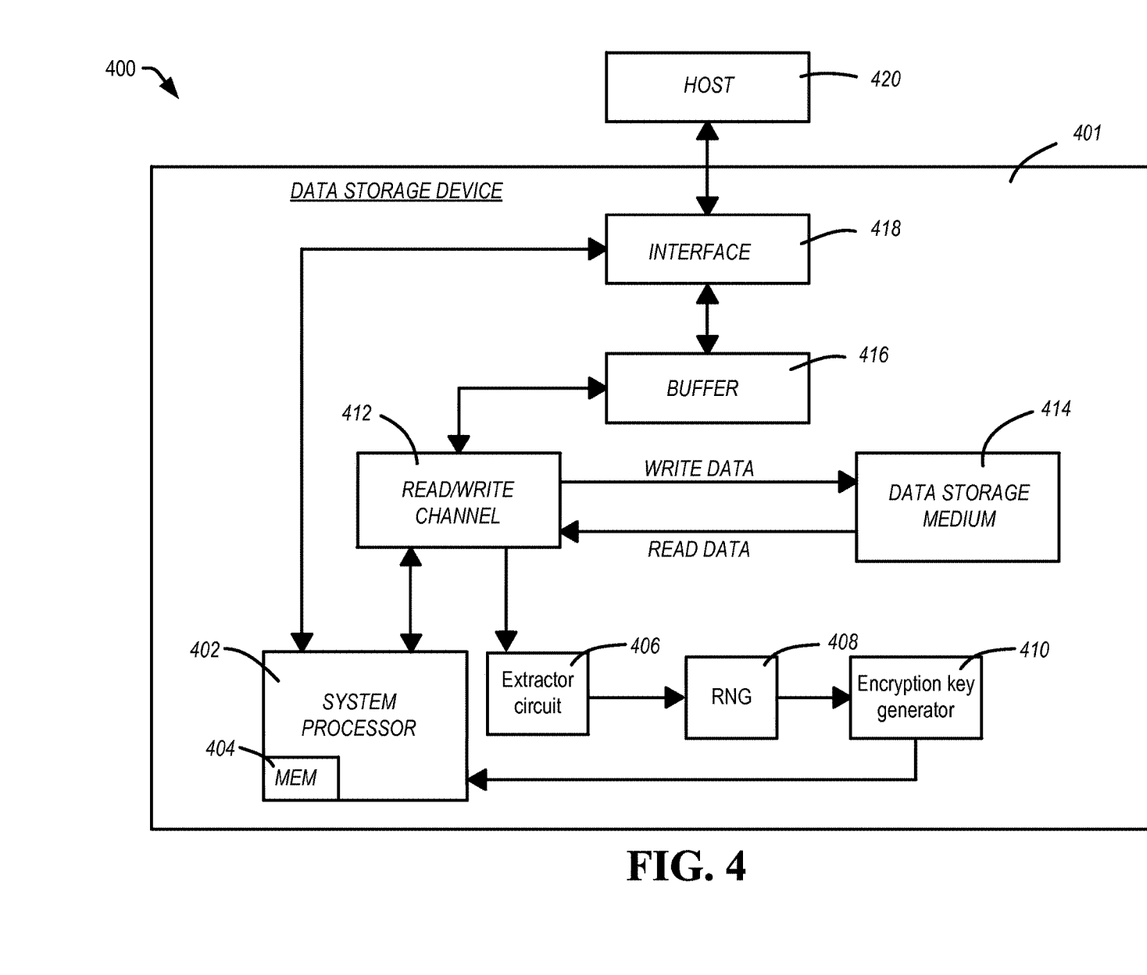
FIG. 4 is a diagram of a system configured to determine random values from data errors, in accordance with certain embodiments of the present disclosure.

Referring to FIG. 4, a system configured to determine random values from data errors is shown and generally designated 400. The system 400 can be an example of a data storage device (DSD), and is an example of systems 100 and 200 according to certain embodiments. The DSD 401 can optionally connect to be removable from a host device 420, which can be a device or system having stored data, such as a desktop computer, a laptop computer, a server, a digital video recorder, a photocopier, a telephone, a music player, other electronic devices or systems not listed, or any combination thereof. The data storage device 401 can communicate with the host device 420 via the hardware/firmware based host interface circuit 418 that may include a connector (not shown) that allows the DSD 401 to be physically connected and disconnected from the host 420.

The DSD 401 can include a system processor 402, which may be a programmable controller, and associated memory 404. The system processor 402 may be part of a system on chip (SOC). A buffer 416 may temporarily store data during read and write operations, and can include a command queue. The read-write (R/W) channel 412, which may be the randomness source 202, can encode data during write operations to, and decode data during read operations from, the data storage medium 414.

The DSD may include an extractor circuit 406 coupled to the R/W channel 412 and the random number generator (RNG) 408. The extractor circuit 406, which may be the extractor circuit 204, can calculate a random value based on random errors in the R/W channel 412, and provide the random value to the RNG 408. The RNG 408 (e.g. RNG 214) can provide random numbers to the encryption key generator 410. The encryption key generator 410 can provide encryption key(s) to the system processor 402 or other encryption circuit, which may use the encryption key(s) to encrypt data for storage on o a memory transmission to the host 420.

Figure 5:
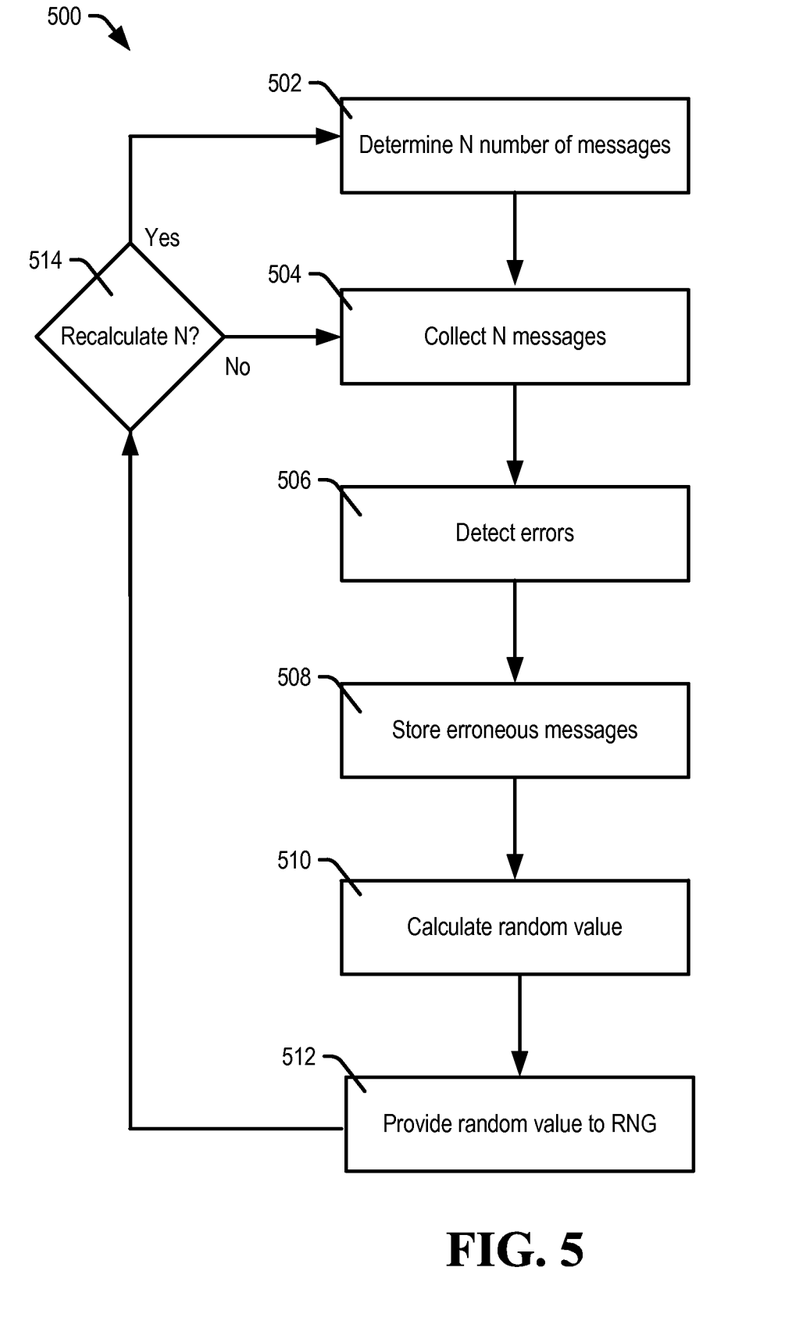
FIG. 5 is a flowchart of a method of determining random values from data errors, in accordance with certain embodiments of the present disclosure.

Referring to FIG. 5, a flowchart of a method of determining random values from data errors is shown and generally designated 500. The method 500 may be an implementation of systems 100, 200, or 300, according to certain embodiments. The method 500 can include determining N number of data messages to collect from a randomness source to produce a minimum level of randomness, $E_{min}$, at 502. The number N may be predetermined or determined on-the-fly as needs or variations in a system change.

The method 500 may also include collecting a number "N" of data messages from a message space, at 504. In some embodiments, an extractor circuit, a message collector circuit, or other circuit can collect the N data messages from a communications channel, such as a data channel in a receiver or data storage device. In some examples, the method 500 may include receiving an analog signal and converting it to a digital signal, then sampling the digital signal to collect the N messages.

Further, the method 500 can include identifying erroneous messages by detecting errors in the collected messages, at 506, and may include storing the erroneous messages to a memory, at 508.

The method 500 can also include calculating a random value based on the stored data errors, at 510, and may then provide the random value to an RNG or other circuit, at 512. The random value may be used by a RNG as a random value to generate a random number, may be used by an encryption circuit as a random number, may be used by another circuit or controller of a system for any other purpose, such as triggering a random event, or any combination thereof.

The method 500 can further include determining when to recalculate N, at 514. In some examples, a circuit (e.g. processor, extractor circuit, or other circuit) may determine the noise probability has changed. Changes in the noise probability may be due to environmental changes (e.g. temperature) or other changes (e.g. silicon properties). The number N of data messages may be recalculated, at 502. When N is not recalculated, the method can include collecting N data messages from the message space, at 504.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   an extractor circuit configured to:
      collect data messages;
      select data messages having an error from the collected data messages;
      calculate a random value based on the selected data messages; and
      provide the random value to a random number generator.

2. The apparatus of claim 1 comprising the extractor circuit further configured to:
   perform the collecting of data messages and the selecting of the data messages by:
      collecting a number, "N", of data messages, and
      selecting the data messages having an error from the N data messages.

3. The apparatus of claim 2 comprising the extractor circuit further configured to:
   store the selected data messages having an error to a memory; and
   perform the calculating of the random value at least in part based on the stored selected data messages having an error.

4. The apparatus of claim 3 comprising the extractor circuit further configured to:
   perform the calculating of the random value at least in part by concatenating the stored selected data messages having an error to produce the random value.

5. The apparatus of claim 3 comprising the extractor circuit further configured to:
   perform the calculating of the random value at least in part by combining the stored selected data messages to produce the random value.

6. The apparatus of claim 3 comprising the extractor circuit further configured to:
   determine a noise probability "p" has changed to a new noise probability, "p'"; and
   at least partly in response to the determining that the noise probability "p" has changed to the new noise probability, "p'", collecting a new number "N'" of messages based on p'.

7. A system comprising:
   a circuit configured to:
      extract erroneous messages from messages from a data channel; and
      calculate a random value based on the erroneous messages.

8. The system of claim 7 further comprising the extractor circuit includes:
   a message collector circuit configured to collect a number, "N", of messages from the data channel; and
   an error detector circuit configured to perform the extraction of the erroneous messages by extracting the erroneous messages from the N messages.

9. The system of claim 8 further comprising the circuit includes:
a random value calculator circuit coupled to the message collector circuit configured to perform the calculation of the random value from the erroneous messages.

10. The system of claim 9 further comprising:
a data storage device having an interface to communicate with a host computer, the interface having a physical connector to allow removal of the data storage device from the host, the data storage device including:
the data channel coupled to at least one data storage medium configured to read and write data to the at least one data storage medium;
a processor operably coupled to the interface, configured to manage read and write operations from the host computer and convey a signal to the at least one data storage medium; and
the circuit.

11. The system of claim 8 further comprising:
the message collector circuit includes the error detector circuit configured to perform the extraction the erroneous messages; and
the error detector circuit further configured to store the erroneous messages to a memory.

12. The system of claim 11 comprising a random value calculator circuit configured to perform at least part of the calculation of the random value by combining the erroneous messages.

13. The system of claim 11 comprising a random value calculator circuit configured to perform at least part of the calculation of the random value by concatenating the erroneous messages.

14. The system of claim 11 further comprising:
the memory is a first in first out (FIFO) circuit.

15. A method comprising:
collecting data messages;
selecting erroneous data messages having an error from the collected data messages;
calculating a random value based on the erroneous data messages; and
providing the random value to a random number generator.

16. The method of claim 15 further comprising:
determining a number, "N", of data messages to collect; and
performing the collecting of the data messages by collecting N data messages from a data channel.

17. The method of claim 16 further comprising:
storing the erroneous data messages to a memory.

18. The method of claim 17 further comprising:
performing the calculating of the random value by calculating the random value based on the erroneous data messages stored in the memory.

19. The method of claim 18 further comprising:
determining if the number N should be re-calculated;
determining a new number, "N'", of data messages; and
collecting the new number N' of data messages.

20. The method of claim 18 further comprising:
determining a noise probability "p" has changed to a new noise probability, "p'"; and
at least partly in response to the determining that the noise probability "p" has changed to the new noise probability, "p'", determining a new number, N', based on p'.

* * * * *